United States Patent
Zelensky et al.

(10) Patent No.: US 8,687,974 B2
(45) Date of Patent: Apr. 1, 2014

(54) SKEW COMPENSATION AND TRACKING IN COMMUNICATIONS SYSTEMS

(75) Inventors: Yuri Zelensky, Lyndhurst, OH (US); Fan Mo, Hinckley, OH (US)

(73) Assignee: ViaSat, Inc., Carlsbad, CA (US)

( * ) Notice: Subject to any disclaimer, the term of this patent is extended or adjusted under 35 U.S.C. 154(b) by 72 days.

(21) Appl. No.: 13/205,441

(22) Filed: Aug. 8, 2011

(65) Prior Publication Data

US 2012/0189320 A1 Jul. 26, 2012

Related U.S. Application Data

(60) Provisional application No. 61/435,278, filed on Jan. 22, 2011.

(51) Int. Cl.
*H04B 10/00* (2013.01)

(52) U.S. Cl.
USPC ........... 398/158; 398/202; 398/208; 398/209; 398/159; 398/33; 398/25; 398/136; 398/192; 398/194; 398/195

(58) Field of Classification Search
USPC ......... 398/202, 204, 205, 206, 207, 208, 209, 398/210, 211, 212, 213, 214, 183, 184, 188, 398/65, 152, 158, 159, 33, 34, 25, 26, 27, 398/135, 136, 137, 138, 139, 147, 81, 203
See application file for complete search history.

(56) References Cited

U.S. PATENT DOCUMENTS

| | | | |
|---|---|---|---|
| 7,251,256 B1 | 7/2007 | Barry et al. | |
| 7,266,310 B1 | 9/2007 | Savory et al. | |
| 8,249,463 B2 * | 8/2012 | Perkins | 398/152 |
| 8,301,039 B2 * | 10/2012 | Nishihara et al. | 398/209 |
| 2004/0184487 A1 | 9/2004 | Kim | |
| 2004/0223767 A1 | 11/2004 | Pappalardo et al. | |
| 2006/0013590 A1 | 1/2006 | Hueda et al. | |
| 2007/0065078 A1 | 3/2007 | Jiang | |
| 2007/0217792 A1 | 9/2007 | Nonaka et al. | |
| 2010/0209121 A1 * | 8/2010 | Tanimura | 398/202 |
| 2010/0232809 A1 | 9/2010 | Cai et al. | |
| 2010/0239264 A1 | 9/2010 | Yang et al. | |
| 2010/0329677 A1 | 12/2010 | Kaneda et al. | |
| 2011/0064421 A1 | 3/2011 | Zhang et al. | |
| 2012/0033965 A1 | 2/2012 | Zhang et al. | |

FOREIGN PATENT DOCUMENTS

EP 2352239 A1 8/2011

OTHER PUBLICATIONS

International Search Report and Written Opinion dated Aug. 30, 2012, PCT/US2012/022231 to ViaSat, Inc. et al., 8 pgs.
International Search Report and Written Opinion dated Aug. 30, 2012, PCT/US2012/022234 to ViaSat, Inc. et al., 10 pgs.

(Continued)

*Primary Examiner* — Hanh Phan
(74) *Attorney, Agent, or Firm* — Holland & Hart LLP

(57) ABSTRACT

Compensation for in-phase (I) and quadrature (Q) timing skew and offset in an optical signal may be achieved based on the correlation between derivatives of I and Q samples in the optical signal. The magnitude of the correlation between derivatives is measured to determine the presence of skew. Correlation between derivatives may be coupled with frequency offset information and/or with trials having additional positive and negative skew to determine presence of skew. Correlations are determined according to pre-defined time periods to provide for continued tracking and compensation for timing skew that may result from, for example, thermal drift.

22 Claims, 11 Drawing Sheets

(56) References Cited

OTHER PUBLICATIONS

Non-final Office Action dated Dec. 28, 2012, U.S. Appl. No. 13/205,431 to Mo et al., 12 pgs.

International Preliminary Report on Patentability dated Aug. 1, 2013, Int'l App. No. PCT/US2012/022231 to ViaSat, Inc. et al., 5 pgs.
Non-final Office Action dated Jul. 29, 2013, U.S. Appl. No. 13/205,431 to Mo et al., 12 pgs.

* cited by examiner

SKEW COMPENSATION AND TRACKING IN COMMUNICATIONS SYSTEMS

CROSS REFERENCES

The present application claims the benefit of U.S. Provisional Patent Application No. 61/435,278, filed on Jan. 22, 2011, entitled "HIGH RATE OPTICAL COMMUNICATION," which is incorporated herein by reference in its entirety.

BACKGROUND

The present disclosure relates to systems and methods for compensation of skew between in-phase and quadrature signals in a fiber optic communications system.

Fiber optic channels in network communications systems are well known and are considered effective for data transmission, allowing relatively high bandwidth data communication. Optical fiber used in such channels is flexible and can be bundled as cables, and is generally considered to be advantageous for long-distance communications because light propagates through the fiber with little attenuation compared to electrical cables. Typical present day commercial optical fiber systems transmit data at 10 or 40 Gbit per second. Each fiber can carry multiple independent channels, each using a different wavelength of light in a technique known as wavelength-division multiplexing (WDM), thereby enhancing the net data rate of an optical fiber.

As more capacity is continually desired for networks, increased data transmission rates would be desirable. However, in fiber optic systems, as data rates increase various optical phenomena begin to manifest and act to limit data transmission rates. For example, a propagation skew between, for example, in-phase (I) and quadrature (Q) channels in a quadrature phase shift keyed (QPSK) system. Even relatively small amounts of skew between channels can begin to have a significant impact on system performance at increasing data rates. Such skew can result from, for example, slightly different length communications paths in a receiver, and/or thermal drift in a receiver.

SUMMARY

Methods, systems, and devices are described for compensation of skew in received channels of an optical signal. One example of a method of skew compensation includes receiving a plurality of in-phase and quadrature samples of a received optical signal, measuring a correlation between a derivative of the in-phase samples and a derivative of the quadrature samples, and generating a skew correction factor responsive to the correlation.

An apparatus for skew compensation may include a skew compensation module, a skew correlation module, and a skew update module. The skew compensation module may receive a plurality of in-phase and quadrature samples of a received optical signal, receive skew update information from the skew update module, and output skew-compensated in-phase and quadrature samples based on the skew update information. The skew correlation module, in various embodiments, receives in-phase and quadrature samples of the received optical signal, and measures a correlation between a derivative of the in-phase samples and a derivative of the quadrature samples. The correlation between the derivatives provides an indication of skew present in the received channels, and the skew update module may use this information to generate a skew correction factor responsive to the correlation.

A method of skew compensation may include receiving a plurality of in-phase and quadrature samples of a received optical signal; measuring a correlation between a derivative of the in-phase samples and a derivative of the quadrature samples; and generating a skew correction factor responsive to the correlation.

An apparatus for skew compensation between in-phase and quadrature channels in an optical signal may include a skew compensation module configured to receive a plurality of in-phase and quadrature samples of a received optical signal, receive skew update information, and output skew-compensated in-phase and quadrature samples based on the skew update information; a skew correlation module configured to receive in-phase and quadrature samples of the received optical signal, and measure a correlation between a derivative of the in-phase samples and a derivative of the quadrature samples; and a skew update module configured to receive the measured correlation information and generate a skew correction factor responsive to the correlation.

A system of skew compensation may include means for receiving a plurality of in-phase and quadrature samples of a received optical signal, measuring a correlation between a derivative of the in-phase samples and a derivative of the quadrature samples, and generating a skew correction factor responsive to the correlation.

BRIEF DESCRIPTION OF THE DRAWINGS

A further understanding of the nature and advantages of embodiments of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides examples, and is not intended to limit the scope, applicability or configuration of embodiments of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
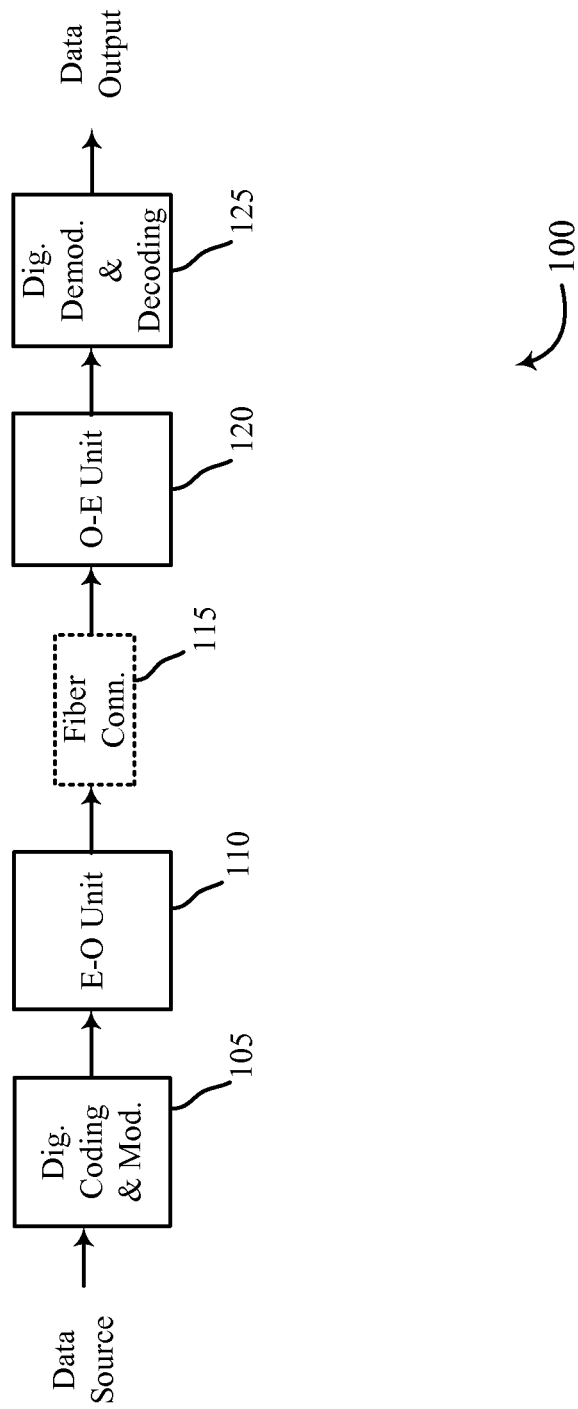
FIG. 1 is a block diagram of an optical communication system including components configured according to various embodiments of the invention.

Systems, devices, methods, and software are described for an optical communication system that utilizes fiber optic optical cables as a data transmission medium. An example of an optical data transport system 100 is illustrated in FIG. 1. In this embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. The digital coding and modulation unit 105 receives this data, and performs framing, forward error correction coding, and modulation functions on the data. The electrical-to-optical (E-O) unit 110 transforms the data into optical signals, and transmits optical signals containing the data via a fiber connection 115. The fiber connection 115 may include well known components of such connections, including a fiber optic cable. An optical-to-electrical (O-E) unit 120 receives the optical signal from the fiber connection 115, and transforms the data into the electrical domain. The digital demodulation and decoding unit 125 receives the digitized version of the optical signal and performs demodulation, forward error correction decoding, and de-framing functions on the data from the optical signal. The digital demodulation and decoding unit 125 may then output the data (e.g., to a user telecommunications device, a cable operator head-end unit, a telecommunications provider central office, a computer server, or a network attached storage system).

Figure 2:
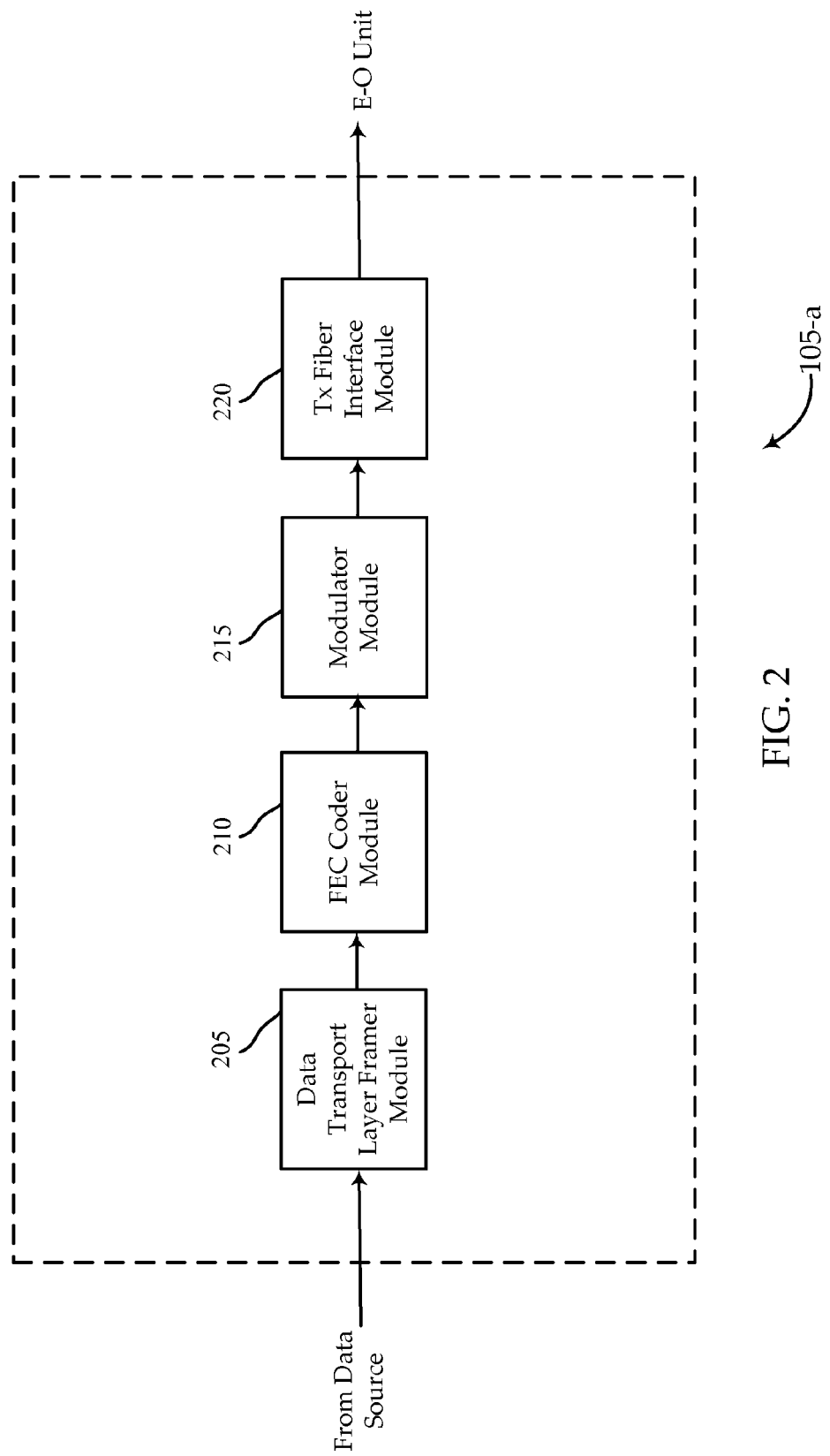
FIG. 2 is a block diagram of an electrical-to-optical unit according to various embodiments of the invention.

FIG. 2 illustrates a digital coding and modulation unit 105-*a*. In the illustrated embodiment, the digital coding and modulation unit 105-*a* includes a data transport layer framer module 205, an FEC coder module 210, a modulator module 215, and a transmitter fiber interface module 220. The data transport layer framer module 205 may place the data received from the data source into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission. The FEC coder module 210 calculates and adds forward error correction (FEC) information to the frames of data received from the data transport layer framer module 205. The particular type of FEC information of various embodiments generally includes systematically generated redundant error-correcting code (ECC) data that is transmitted along with the frames. There may be differential encoding used in some embodiments. The modulator module 215 modulates the frames and FEC information, forwarding the data to a transmitter fiber interface module 220. The transmitter fiber interface module 220 may forward the modulated data to the E-O module where it may be transmitted in the optical domain via a dual-polarity (dual-pole) quadrature phase-shift-keying (QPSK) modulation, resulting in four parallel optical streams. Other modulation schemes may be used in other examples, as well.

Figure 3:
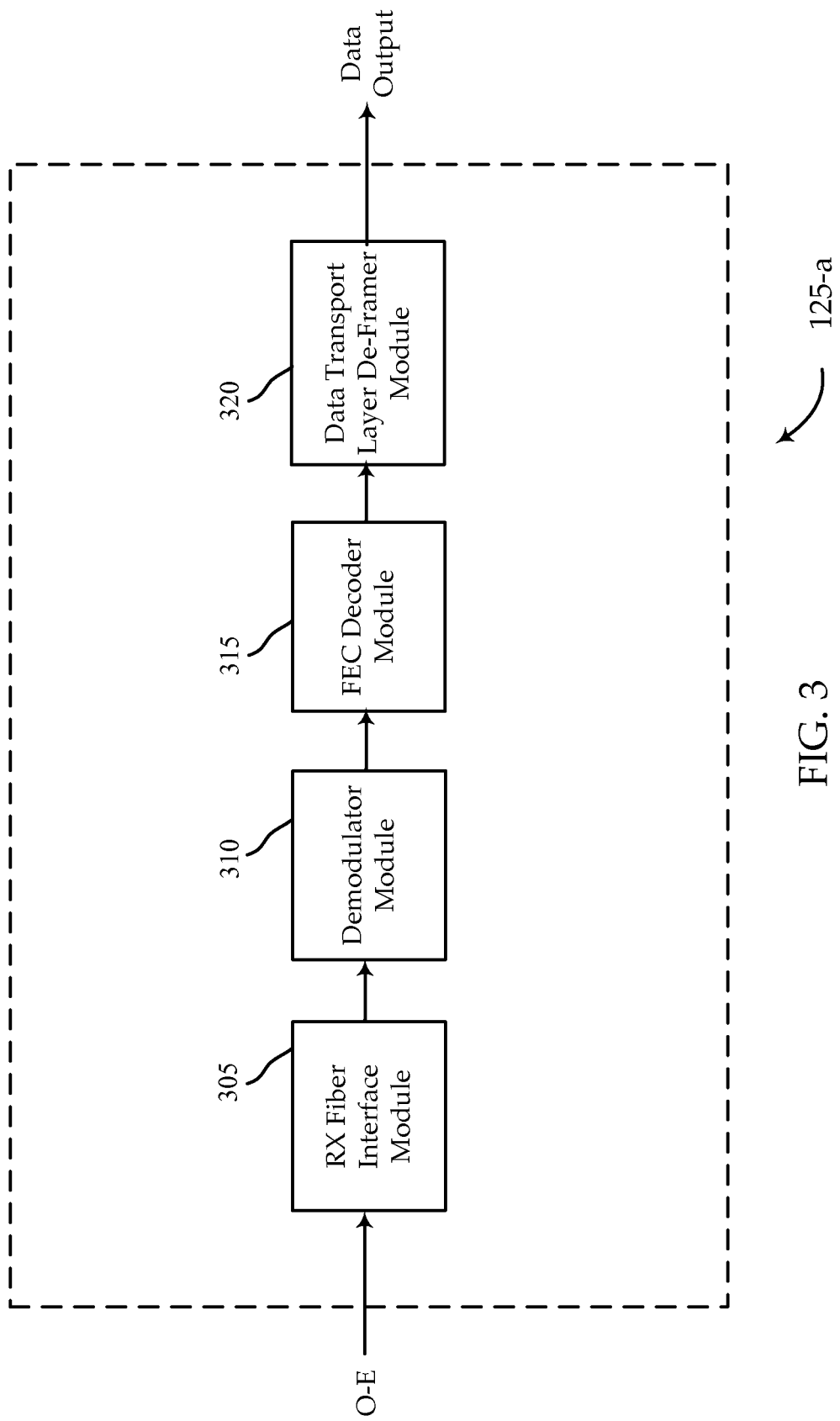
FIG. 3 is a block diagram of an optical-to-electrical unit according to various embodiments of the invention.

As illustrated in FIG. 3, a digital demodulation and decoding unit 125-*a* may include a number of modules, as well. In this embodiment the digital demodulation and decoding unit 125-*a* includes a receiver fiber interface module 305, a demodulator module 310, an FEC decoder module 315, and a data transport layer de-framer module 320. The receiver fiber interface module 305 is the interface from the O-E unit 120. The receiver fiber interface module 305 provides electrical signals to a demodulator module 310. Various embodiments of the demodulator module 310 will be discussed in further detail below. The information from the demodulator module 310 is provided to the FEC decoder module 315 which decodes and may correct transmission errors identified from error-correcting code. The FEC decoder module 315 provides decoded data to the data transport layer de-framer module 320, which de-frames the data from the signal according to the particular protocol used in the optical transmission, and provides output data. The data output may be, for example, a user or any receiving system.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 4:
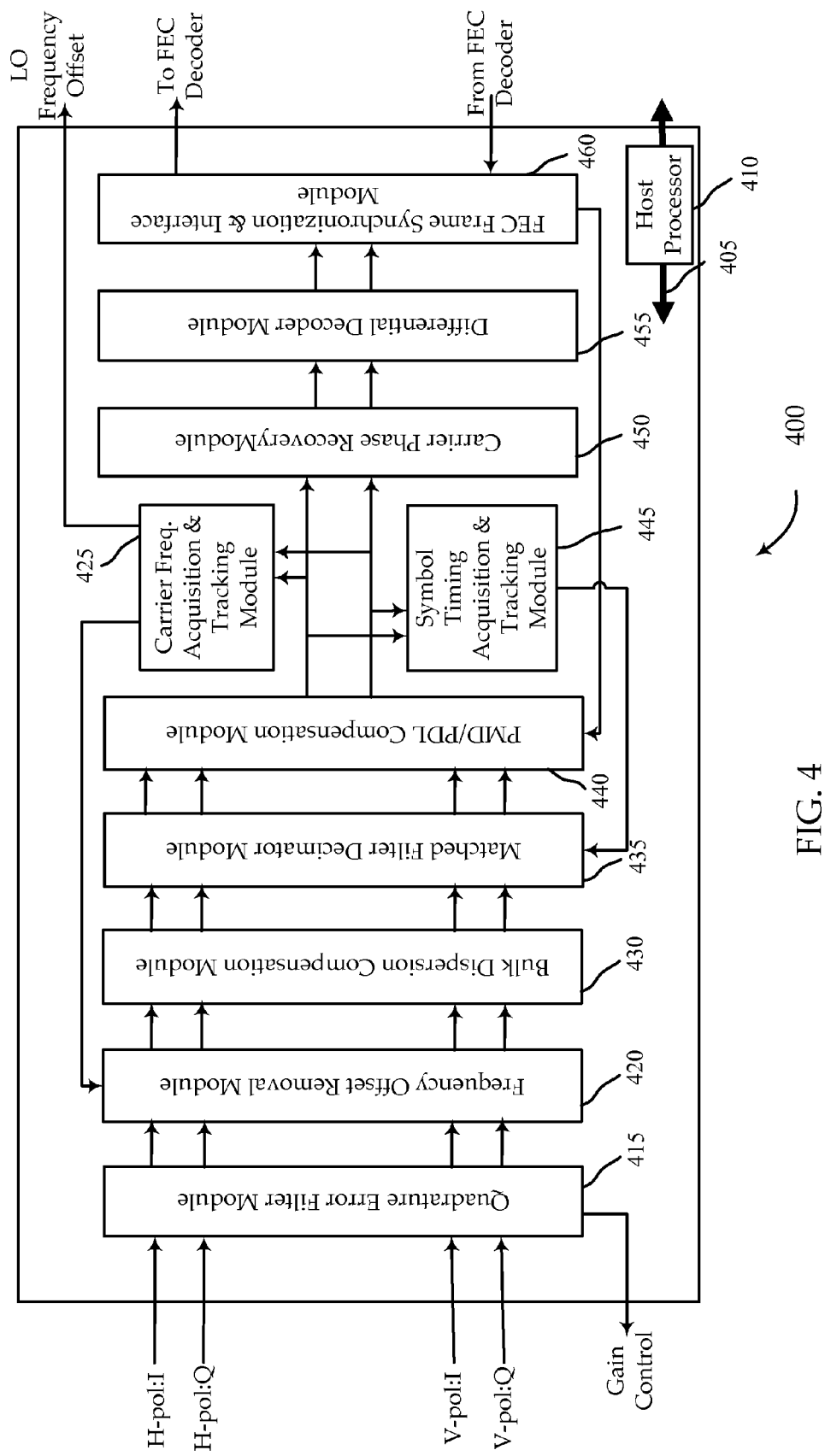
FIG. 4 is a block diagram of a demodulator unit according to various embodiments of the invention.

Referring now to FIG. 4, a demodulator unit 400 is described. This may be the demodulator unit 310 of FIG. 3. In this example, two polarization components are received, one horizontal component (H) and one vertical component (V). Each of the H and V components includes both an in-phase (I) component and a quadrature (Q) component. For reference, the two components in the horizontal polarization are referred to as HI (horizontal in-phase component) and HQ (horizontal quadrature component). Similarly, the two components in the vertical polarization are referred to as VI (vertical in-phase component) and VQ (vertical quadrature component). The demodulator unit 400 processes the digitized samples of the I and Q components of the two polarization components to recover the transmitted data. At the input, the demodulator unit 400 accepts the four parallel streams carrying HI, HQ, VI and VQ samples. In one embodiment, each stream contains multiple samples per clock. At its output the demodulator may provide demodulated hard-decision data (although in other examples, soft-decision data may be provided) to the FEC decoder module (e.g., FEC decoder module 315 of FIG. 3). The demodulator unit 400 may identify the beginning of an FEC frame. Additionally, in some embodiments the demodulator unit 400 receives feedback signals from the FEC decoder module 315 regarding the convergence status for error correction.

In some embodiments, the demodulator unit 400 is implemented as an application specific integrated circuit (ASIC) that includes a number of functional modules. In such embodiments, the demodulator unit 400 may have a control and monitor interface bus 405 connected to a host processor 410 allowing for configuration of demodulator parameters (filter coefficients, loop gains, etc.) and extraction of demodulator status. With continuing reference to FIG. 4, several of the sub-modules within the demodulator unit 400 of various embodiments are described. In this embodiment, a quadrature error filter (QEF) module 415 provides a collection of data formatting, error detection and correction functions. In one embodiment, input data samples are expected to be in binary-offset/offset-binary format and are converted to a two's complement (2C) format for processing within a digital signal processor. The incoming HI, HQ, VI and VQ streams, in some embodiments, also can be independently swapped and inverted if needed, allowing for any design issues that might translate into an accidental inversion or IQ swap. Each data stream of these various embodiments may be processed to remove polarization skew (between H and V poles) as well as I-Q skew within a pole. The QEF module 415 may provide for detection and removal of four types of quadrature signal errors: I/Q Skew, DC bias, I/Q amplitude imbalance, and I/Q phase imbalance. All four error detectors may be independently enabled or disabled, in some embodiments, via the processor interface, and the detected error values are output as status values via this same interface. The QEF module 415 may also output a gain control signal that may be used by other components of the system.

The QEF module 415 is connected to a frequency offset removal module 420. The frequency offset removal module 420 in one example performs a frequency rotation on the data samples coming out of the QEF module 415. The amount of frequency rotation is controlled by a frequency error input that is sourced by a carrier frequency acquisition and tracking (CFAT) module 425. Such frequency offset removal function may remove residual frequency left from the local oscillator (LO) laser tuning in the optical domain. A bulk dispersion compensation module 430 removes bulk chromatic dispersion from the horizontal and vertical polarization channels. The compensation may be applied via a filter in the frequency domain. The amount of correction may be controlled by the chromatic dispersion filter inputs that are derived outside of the demodulator module 400 and provided via the host processor 410 and control and monitor interface bus 405, in this embodiment.

A matched filter decimator (MFD) module 435 may implement an interpolation function that provides decimation on samples taken at two+ϵ times the symbol rate. In one embodiment, each of the four data streams has an independent bank of FIR filters with selected coefficients. The incoming data is processed through the filter banks to produce two samples per symbol out for each data stream. Data samples are gathered and assembled into blocks of fixed numbers of samples per stream per clock by a sample block assembler. The assembly function may be identical for the I and Q streams in each polarization, so one assembly block may service two streams. A PMD/PDL compensation module 440 may utilize adaptive equalization to compensate for cross-polarization interference, IQ channel interference, adjacent symbol interference introduced by PMD and PDL in optical channel and other residual impairments, such as residual chromatic as mentioned above. On one embodiment, an adaptive equalizer takes in data at one or two samples/symbol from the MFD and processes the data through a bank of FIR filters with adaptive filter tap coefficients.

In some embodiments, a symbol timing acquisition and tracking (STAT) module 445 may estimate symbol timing using an early/late symbol radius matching scheme and PI controller, and generate an error signal to correct symbol timing. This STAT module 445, in an embodiment, also has a symbol timing lock detection mechanism that outputs a symbol lock indicator. In various embodiments, there are two sets of gains for the PI controller (wide band for acquisition and narrow band for tracking). When not in timing lock, the wideband gains may be used, otherwise, the narrowband gains may be used. The STAT module 445 may perform symbol timing acquisition and tracking of a portion of the optical signal after the PMD/PDL compensation module 440 compensates for interference caused by PMD and PDL and before carrier phase recovery on the portion of the optical signal.

The CFAT module 425 may be responsible for acquiring, as well as tracking, carrier frequency. Carrier frequency acquisition is achieved using one of a number of techniques, such as through fast Fourier transform (FFT) with appropriate averaging and peak frequency component detection. The CFAT module 425 may provide a frequency error input to the frequency offset removal module 420. The CFAT module 425, in some embodiments, also provides local oscillator (LO) frequency offset output that may be used with data from the FEC frame synchronization and interface module 460. A carrier phase recovery (CPR) module 450 may use a feed-forward algorithm with a block phase estimator and a phase rotation function to remove residual frequency and phase errors. The CPR module 450 may operate on the on-time data samples produced by the PMD compensation module. A differential decoder module 455 may be responsible, in various embodiments, for accepting symbol streams from the CPR module 450 (e.g., at 1 sample per symbol). The differential decoder module 455 may be configured to differentially decode the signal and provide the decoded output (e.g., a hard-decision output data stream) to the FEC frame synchronization and interface module 460. The FEC frame synchronization and interface module 460 processes data to achieve frame synchronization, and may include three functional blocks for data alignment, frame sync detection, and clock transfer. The FEC frame synchronization and interface module 460 may be configured to skew, swap, and rotate received channels with respect to each other.

Figure 5:
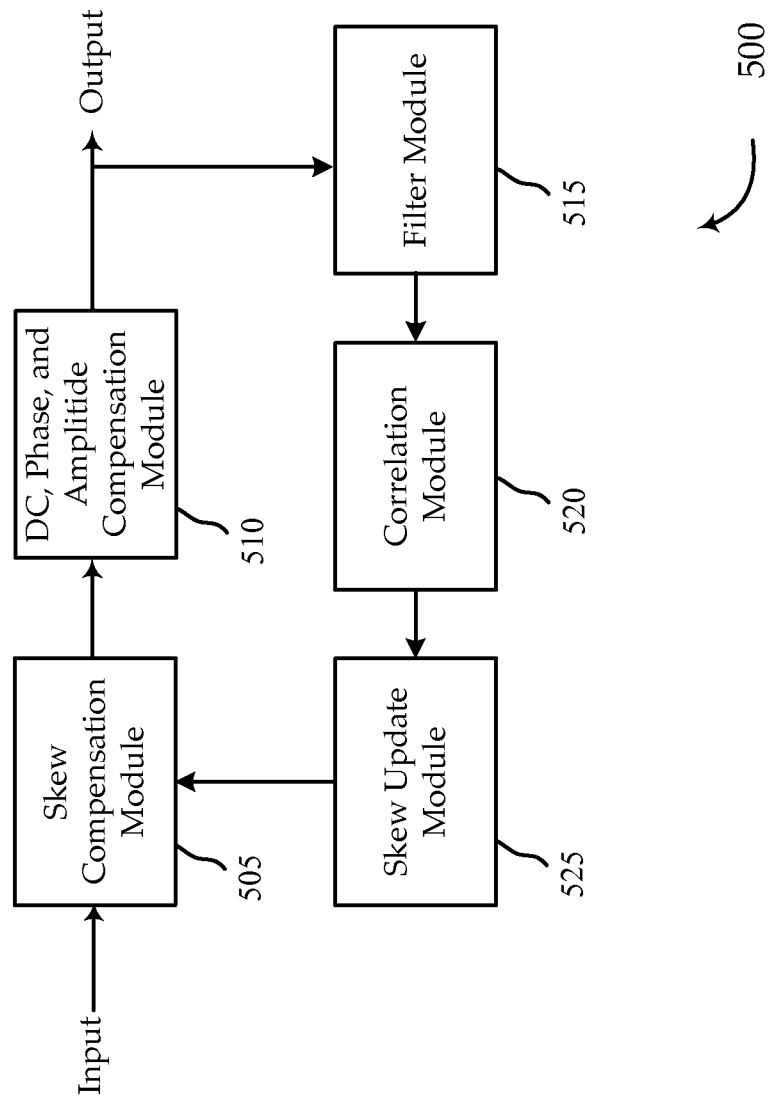
FIG. 5 is a block diagram of a skew compensation unit according to various embodiments of the invention.

With reference now to FIG. 5, a block diagram of a skew compensation system 500 according to various embodiments is described. In this exemplary diagram, an input is received at skew compensation module 505. The input may include two or more input channels, such as an in-phase and a quadrature channel of an QPSK input. In one embodiment, the input receives digitized samples of in-phase and quadrature channels for both horizontal and vertical polarity received optical signals, thereby resulting in four separate received channels. Throughout this description, reference is generally made to in-phase (I) and quadrature (Q) channels, and it is to be understood that multiple sets of such I and Q channels may be received. Furthermore, the concepts described herein are applicable to other types of input channels in which a receiver, or transmitter, may impart some amount of timing skew into such channels. Accordingly, while many of the above examples are directed to optical systems, it is to be understood that skew compensation concepts as described herein are applicable to any quadrature demodulator including demodulators used in both optical and non-optical applications. Skew compensation systems such as in FIG. 5 may be included in a receiver prior to demodulation of a received signal, or may be incorporated as part of the demodulator in such a system. In some embodiments, the components of FIG. 5 are included in the quadrature error filter module 415 of FIG. 4.

With continuing reference to FIG. 5, the skew compensation module 505 receives the input and may delay the output of one or more of the input channels relative to other channels before providing the channels to DC, phase, and amplitude compensation module 510. The DC, phase, and amplitude compensation module 510 analyzes the incoming signal channels and adjusts any DC offset, phase imbalance, and amplitude imbalance in the received input channels, so the channels substantially match each other and have values that correspond to the design of the remaining portions of the demodulator. The DC, phase, and amplitude compensation module 510 outputs the skew compensated and DC, phase, and amplitude compensated channels to the next component of the demodulator, such as the frequency offset removal module 420 of FIG. 4. A filter module 515 is connected to the output of the DC, phase, and amplitude compensation module 510 and receives samples of the output channels. The filter module 515 may be a simple digital filter. The filter module 515 of some embodiments provides an output that corresponds to the first derivative of the I and Q samples. The current disclosure recognizes that in the presence of a time skew and a frequency offset there is a non-zero correlation between first derivatives of I and Q samples. A correlation module 520 is connected to the output of filter module 515, and determines a correlation between I and Q samples, the presence of correlation indicating that timing between channels may be skewed. In some embodiments, the correlation module 520 determines correlation between derivatives according to a relation between the correlation, frequency offset and skew according to the formula:

$$C=k*F*S*P, \text{ where:}$$

k is an implementation-based constant
C is the average correlation of I and Q derivatives;
F is the frequency offset (normalized to sample rate);
S is I to Q time skew (normalized to sample rate); and
P is input signal power.

In some embodiments, two samples per symbol are averaged together over a predetermined time period to determine an average correlation. In one embodiment, the system operates at 20 Gsps, and skew is tracked to 0.5% of a symbol period (or 1% of sample period), k is determined to be 4, and it is known that input frequency error will on average be no smaller that 0.5% of the sample rate or 1% of the symbol rate, resulting in a mean correlation of $4*(0.005*2)*0.01=4e-4$. If a worst-case of 7 dB SNR is assumed, an expected worst-case variance on this measurement would be 0.5. Accordingly, if it is desired that the variance of the estimate be 25% of actual (i.e. 1e-4) then average $(1/1e-4)^2=1e8$, or about 5 milliseconds (at 20 Gsps). In other embodiments, the correlation module 515 may determine the product of the first derivative of the I and Q samples and output a correlation information based on the magnitude of the product, which may be averaged over a predetermined time period.

The correlation module 520 provides the correlation information to a skew update module 525, which provides a skew update to the skew compensation module 505. In some embodiments, the correlation module 520 includes a low pass filter that outputs a filtered version of the average correlation that is used as an input to update filter taps of one or more finite impulse response (FIR) filters of the skew compensation module 505. In other embodiments, the correlation module 520 includes controller, such as a PI controller, that receives the average correlation and outputs filter tap updates for one or more finite FIR filters of the skew compensation module 505.

In other embodiments, a small amount of positive or negative skew is added to I and Q samples, and correlation between first derivatives of samples of the samples are evaluated to determine if the positive or negative skew decreased correlation. One exemplary embodiment of such a system is illustrated in the block diagram of FIG. 6. The skew compensation system 600 in FIG. 6 includes a DC offset compensation module 605 that receives I and Q input channels. A DC compensated version of the I and Q channels are provided to skew compensation module 610. The skew compensation module 610 adjusts the I and/or Q channels to compensate for any detected skew, and provides the compensated output to phase and amplitude compensation module 615. The phase and amplitude compensation module 615 compensates for phase and amplitude imbalance, and provides the compensated I and Q channels to the next component of the demodulator. In this embodiment, a correlation module 620 is connected to each of the I and Q outputs and determines a correlation between derivatives of samples of the I and Q channels. The correlation module 620 of some embodiments determines a magnitude of the product of the first derivatives of the I and Q samples and passes the results through an infinite impulse response (IIR) low-pass filter. The correlation module 620 provides correlation information to skew update module 625.

As noted above, the system 600 of FIG. 6 also adds some amount of positive or negative skew to I and Q samples. Negative skew module 630 adds a known amount of negative skew to the I and Q channels. In one embodiment, the negative skew module skews samples of the I and Q channels by 0.5 percent of the sample period, although it will be understood that other amounts of skew may be implemented. A phase and amplitude compensation module 635 compensates for phase and amplitude offset, and provides the compensated and skewed I and Q channels to a correlation module 640. The correlation module 640 determines a correlation between derivatives of the negative skewed samples of the I and Q channels. The correlation module 640, similarly to correlation module 620, may determine a magnitude of the product of the first derivatives of the I and Q samples and pass the results through an infinite impulse response (IIR) low-pass filter. The correlation module 640 provides negative skew correlation information to skew update module 625.

Figure 6:
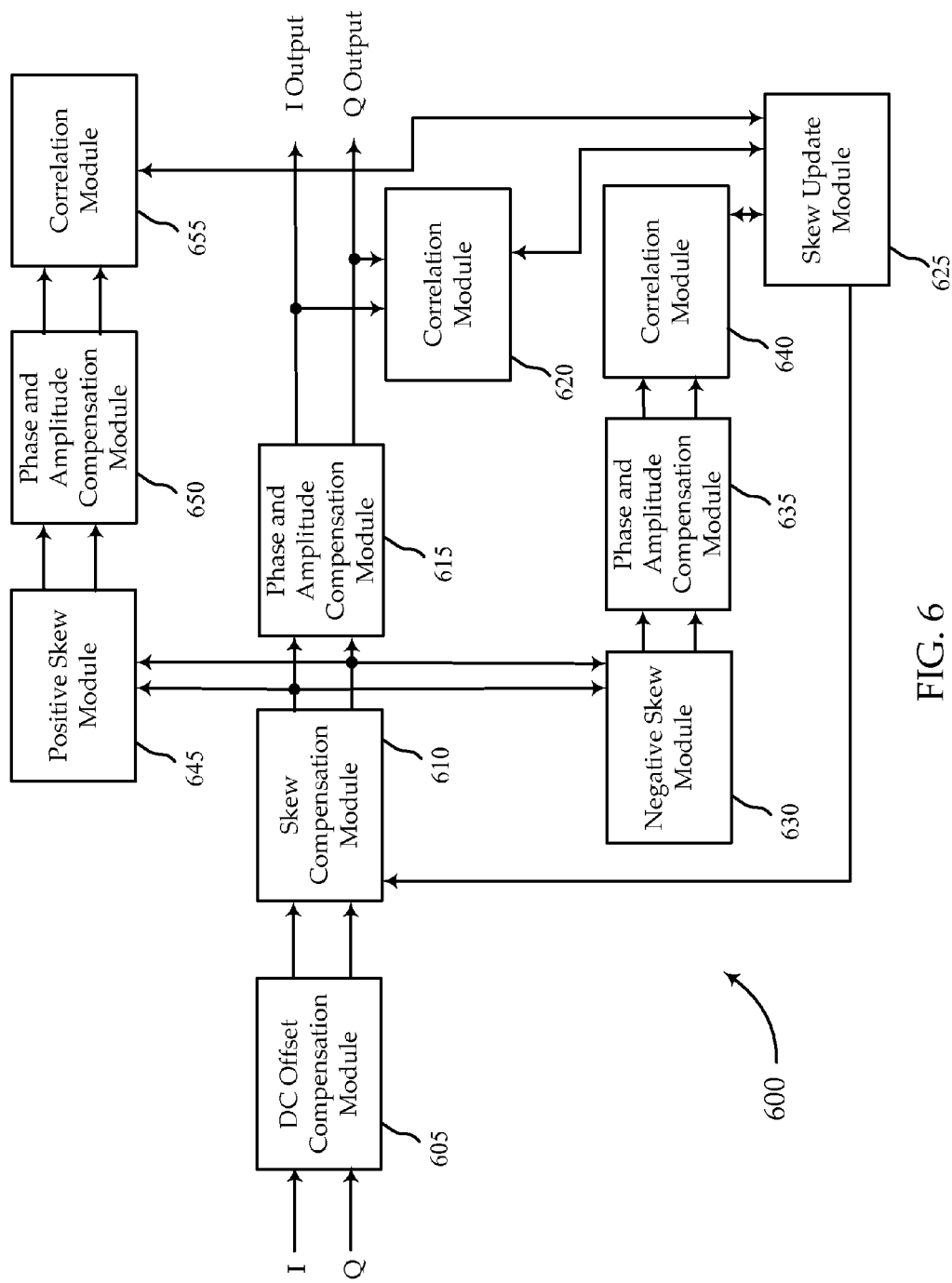
FIG. 6 is a block diagram of an exemplary skew compensation unit according to an embodiment.

Positive skew module 645 of FIG. 6 adds a known amount of positive skew to the I and Q channels. In one embodiment, the positive skew module skews samples of the I and Q channels by 0.5 percent of the sample period, although it will be understood that other amounts of skew may be implemented. Phase and amplitude compensation module 650 compensates for phase and amplitude offset, and provides the compensated and skewed I and Q channels to a correlation module 655. The correlation module 655 determines a correlation between derivatives of the positive skewed samples of the I and Q channels. The correlation module 655, similarly to correlation modules 620 and 640, may determine a magnitude of the product of the first derivatives of the I and Q samples and pass the results through an IIR low-pass filter. The correlation module 655 provides positive skew correlation information to skew update module 625.

Skew update module 625 of FIG. 6 receives correlation information from each of the three correlation modules 620, 640, and 655, and determines which of the three outputs has the lowest magnitude value. The signal with the lowest magnitude value indicates the lowest correlation between the I and Q channels, and also the lowest amount of skew between the channels. If either the positively skewed channel or negatively skewed samples have correlation values that are lower than the samples that do not have additional skew, the skew update module 625 provides an update to the skew compensation module 610 to adjust skew in the I and Q channels. In one embodiment, the skew update module 625 is a state machine that periodically resets the IIR filters of the correlation modules 620, 640, 655, waits a predetermined amount of time, compares the three filtered correlation values, and updates the skew compensation module 610 based on the received correlation values.

Figure 7:
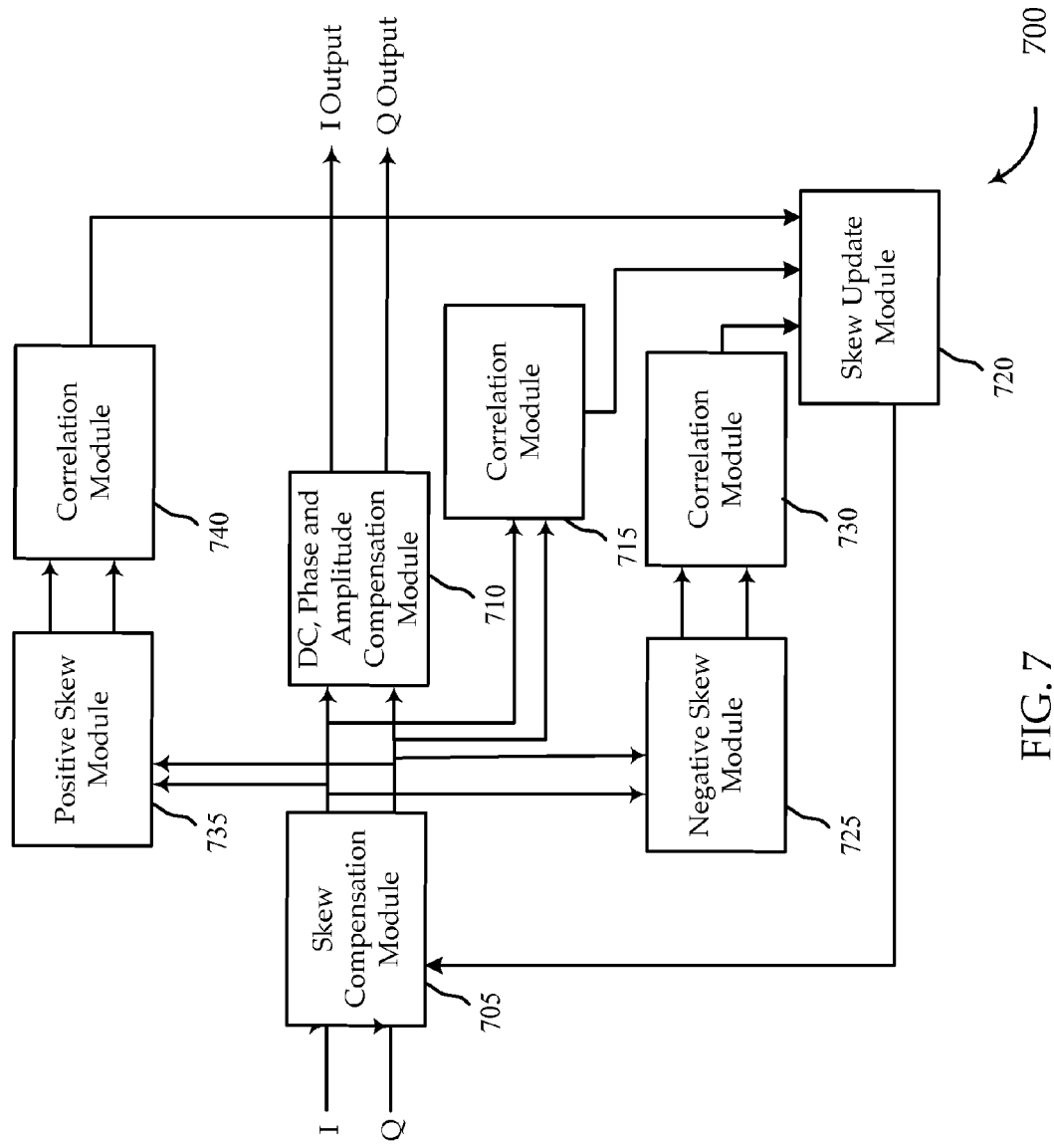
FIG. 7 is a block diagram of an exemplary skew compensation unit according to an embodiment.

FIG. 7 is a block diagram of another embodiment in which a small amount of positive or negative skew is added to I and Q samples, and correlation between first derivatives of samples of the samples are evaluated to determine if the positive or negative skew decreased correlation. The skew compensation system 700 in FIG. 7 receives I and Q channels directly at skew compensation module 705. The skew compensation module 705 adjusts the I and/or Q channels to compensate for any detected skew, and provides the compensated output to a DC, phase and amplitude compensation module 710. The DC, phase and amplitude compensation module 710 compensates for DC offset and phase and amplitude imbalance, and provides the compensated I and Q channels to the next component of the demodulator. In this embodiment, a correlation module 715 is connected to each of the I and Q outputs of the skew compensation module 705 and determines a correlation between derivatives of samples of the I and Q channels. The correlation module 735 of some embodiments determines a magnitude of the product of the first derivatives of the I and Q samples and passes the results through an IIR low-pass filter. The correlation module 715 provides correlation information to skew update module 720.

As noted above, the system 700 of FIG. 7 also adds some amount of positive or negative skew to I and Q samples. Negative skew module 725 adds a known amount of negative skew to the I and Q channels, such as 0.5 percent of the sample period, and provides the skewed I and Q channels to a correlation module 730. The correlation module 730 determines a correlation between derivatives of the negative skewed samples of the I and Q channels. The correlation module 730, similarly to correlation module 715, may determine a magnitude of the product of the first derivatives of the I and Q samples and pass the results through an IIR low-pass filter. The correlation module 730 provides negative skew correlation information to skew update module 720. Similarly, positive skew module 735 adds a known amount of positive skew to the I and Q channels, such as 0.5 percent of the sample period, and provides the skewed I and Q channels to a correlation module 740. The correlation module 740 determines a correlation between derivatives of the positive skewed samples of the I and Q channels and, similarly to correlation modules 715 and 730, may determine a magnitude of the product of the first derivatives of the I and Q samples and pass the results through an IIR low-pass filter. The correlation module 740 provides positive skew correlation information to skew update module 720.

Skew update module 720 of FIG. 7 receives correlation information from each of the three correlation modules 715, 730, and 740, and determines which of the three outputs has the lowest magnitude value. The signal with the lowest magnitude value indicates the lowest correlation between the I and Q channels, and also the lowest amount of skew between the channels. If either the positively skewed channel or negatively skewed samples have correlation values that are lower than the samples that do not have additional skew, the skew update module 720 provides an update to the skew compensation module 705 to adjust skew in the I and Q channels. In one embodiment, the skew update module 720 is a state machine that periodically resets the IIR filters of the correlation modules 715, 730, and 740, waits a predetermined amount of time, compares the three filtered correlation values, and updates the skew compensation module 705 based on the received correlation values.

Figure 8:
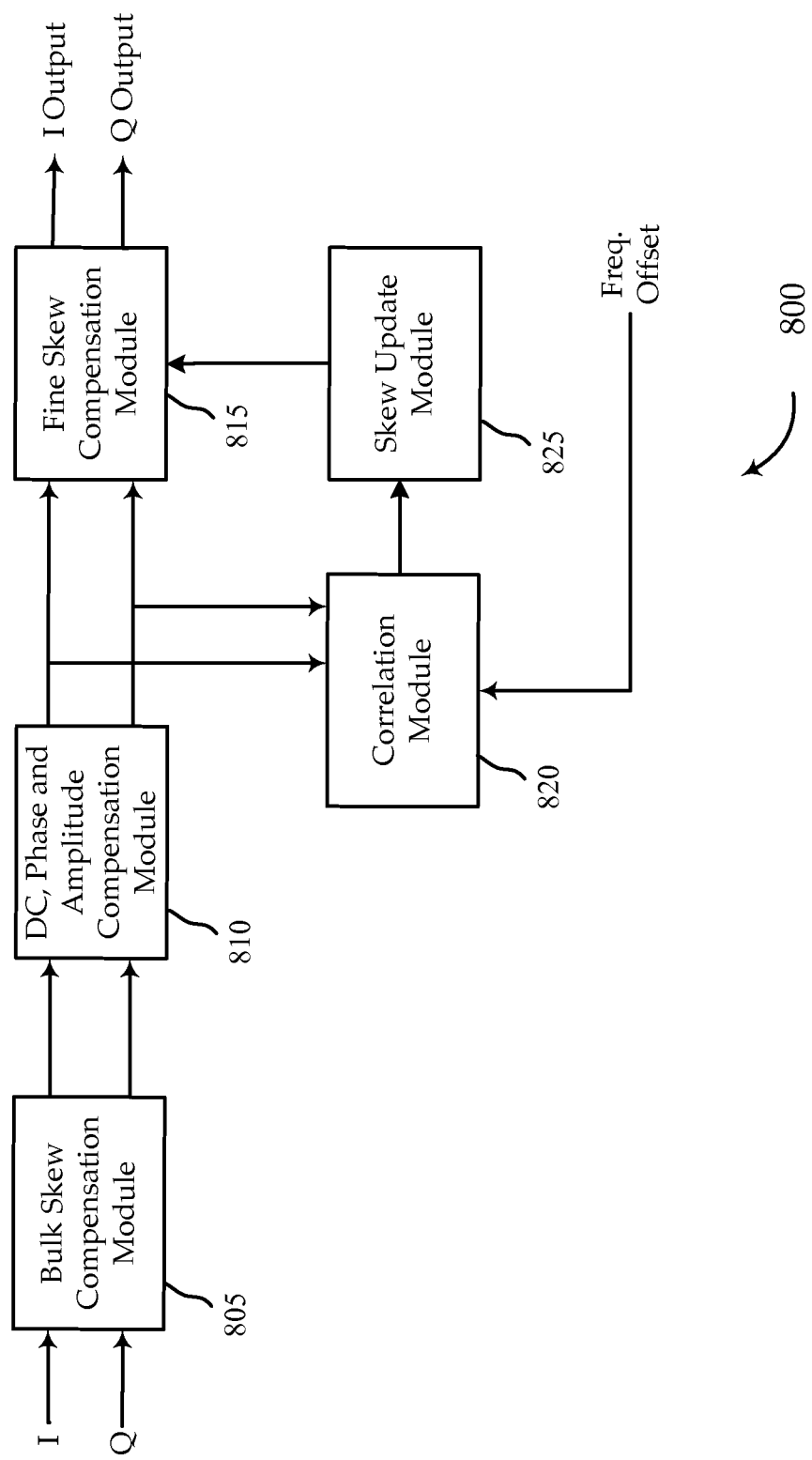
FIG. 8 is a block diagram of an exemplary skew compensation unit according to an embodiment.

In still other embodiments, the system may have information related to frequency offset from a baseband frequency for the I and Q channels. This frequency offset information may be used in a manner similarly as described above, to determine a skew update. A block diagram of skew compensation system 800 that uses frequency offset information is illustrated in FIG. 8. In the system 800 of FIG. 8, I and Q channels are received at a bulk skew compensation module 805. The bulk skew compensation module 805 compensates for skew that is more than half of a sample period, and is configured during an initial calibration of the system 800. A DC, phase and amplitude compensation module 810 compensates for DC offset, and phase and amplitude imbalance in the received I and Q channels. A fine skew compensation module 815 receives the DC, phase and amplitude compensated I and Q channels, and compensates for detected skew that was not removed at the bulk skew compensation module 805. The fine skew compensation module 815 outputs the skew compensated and DC, phase, and amplitude compensated I and Q channels to the next component of the demodulator, such as the frequency offset removal module 420 of FIG. 4.

A correlation module 820 of FIG. 8 is connected to the output of the DC, phase, and amplitude compensation module 810 and receives samples of the output channels and also received frequency offset information, such as from another component of the demodulator. The correlation module 820 determines a correlation between I and Q samples, the presence of correlation indicating that timing between channels may be skewed. In some embodiments, the correlation module 820 determines correlation between derivatives of samples of the I and Q channels as a product of the frequency offset, and derivatives of the I and Q samples. The correlation module 820 provides the correlation information to skew update module 825, which provides a skew update to the fine skew compensation module 815. In some embodiments, the skew update module includes an IIR low pass filter that outputs a filtered version of the average correlation that is used as an input to update filter taps of one or more finite impulse response (FIR) filters of the fine skew compensation module 815.

Figure 9:
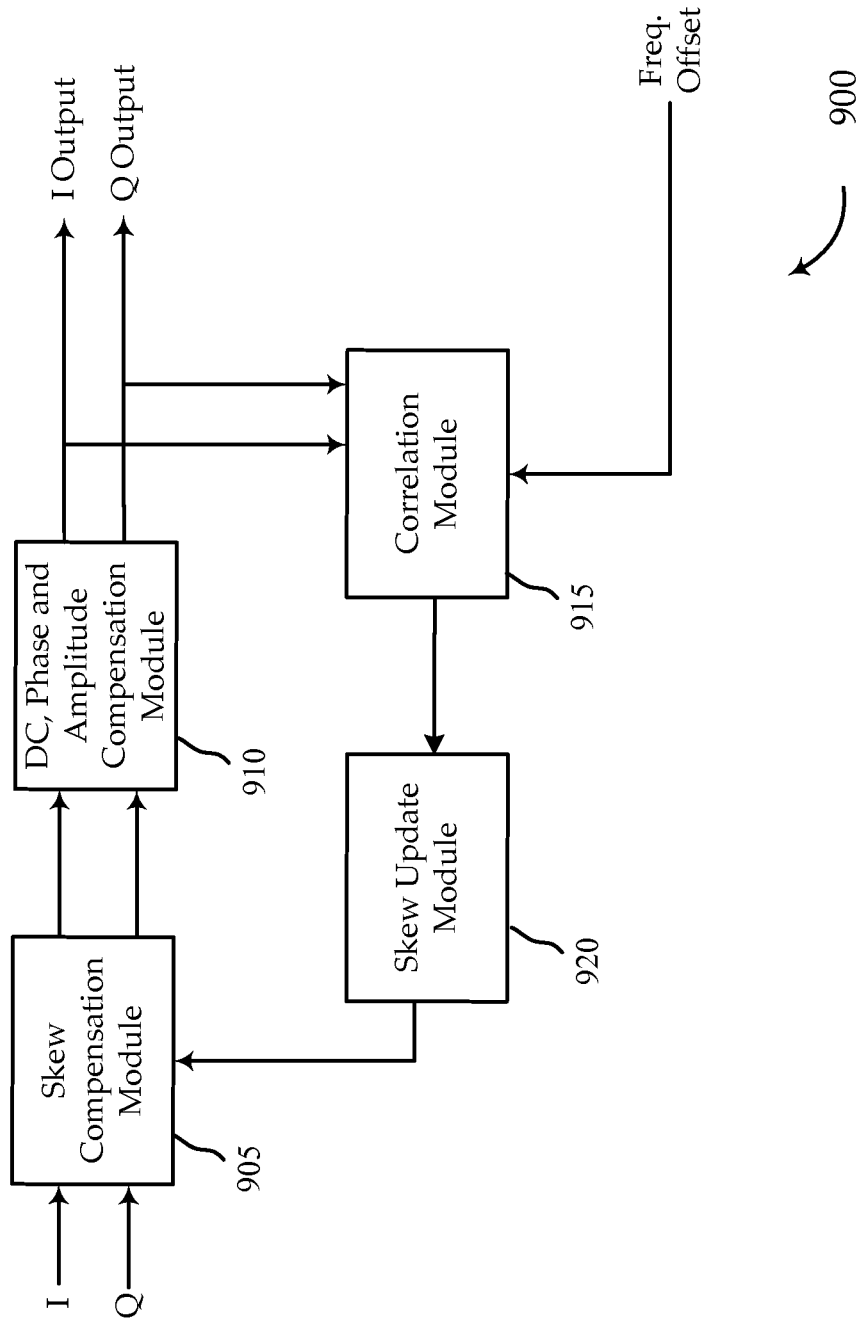
FIG. 9 is a block diagram of an exemplary skew compensation unit according to an embodiment.

With reference now to FIG. 9, block diagram of another skew compensation system 900 that uses frequency offset information is illustrated. In the system 900, I and Q channels are received at a skew compensation module 905. The skew compensation module 905 compensates for detected skew in the I and Q channels, and provides compensated signals to DC, phase and amplitude compensation module 910. DC, phase and amplitude compensation module 910 compensates for DC offset, and phase and amplitude imbalance in the received I and Q channels and outputs the skew compensated and DC, phase, and amplitude compensated I and Q channels to the next component of the demodulator, such as the frequency offset removal module 420 of FIG. 4. A correlation module 915 is connected to the output of the DC, phase, and amplitude compensation module 910 and receives samples of the output channels and also received frequency offset information, such as from another component of the demodulator.

In some embodiments, the frequency offset information includes a positive or negative sign of the frequency error. The correlation module 915 determines a correlation between I and Q samples, the presence of correlation indicating that timing between channels may be skewed. In some embodiments, the correlation module 915 determines correlation between derivatives of samples of the I and Q channels as a product of the sign of the frequency offset, and derivatives of the I and Q samples. The correlation module 915 provides the correlation information to skew update module 920, which provides a skew update to the skew compensation module 905. In some embodiments, the skew update module 920 includes a PI controller that outputs an update signal based on the average of the received correlation information, the output used to update filter taps of one or more finite impulse response (FIR) filters of the skew compensation module 905.

Figure 10:
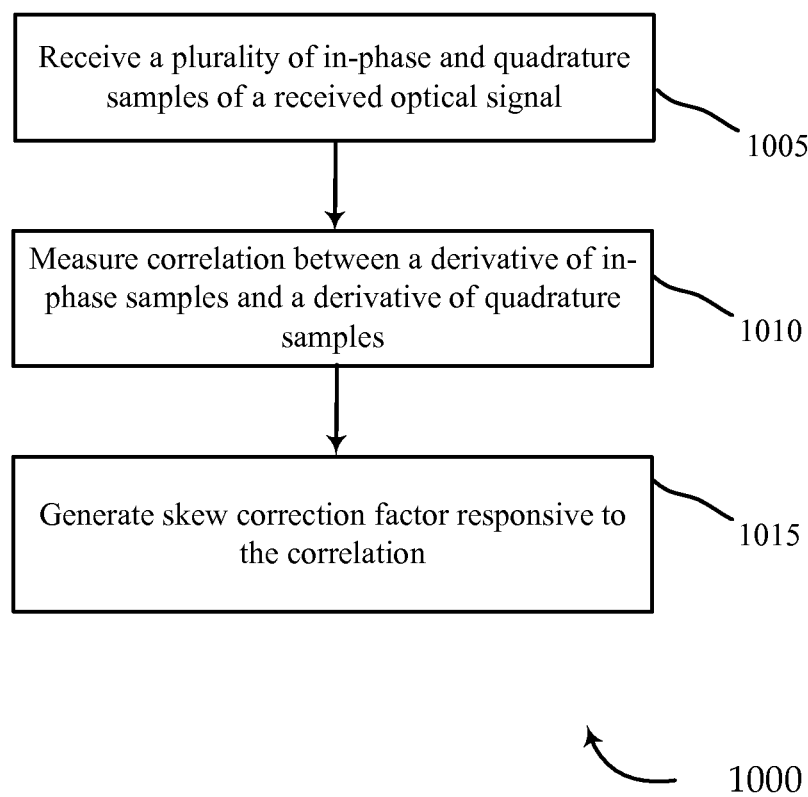
FIG. 10 is a flow chart of a method for skew compensation according to various embodiments of the invention.

With reference now to FIG. 10, a flow chart diagram 1000 of the operational steps for compensating skew of various embodiments is described. Initially, at block 1005, a plurality of in-phase and quadrature samples of an optical signal are received. At block 1010 a correlation between derivatives of the in-phase and quadrature samples is measured. A skew correction factor is generated, at block 1015, responsive to the correlation. The skew correction factor may be used to compensate for skew that is detected based on the measured correlation.

Figure 11:
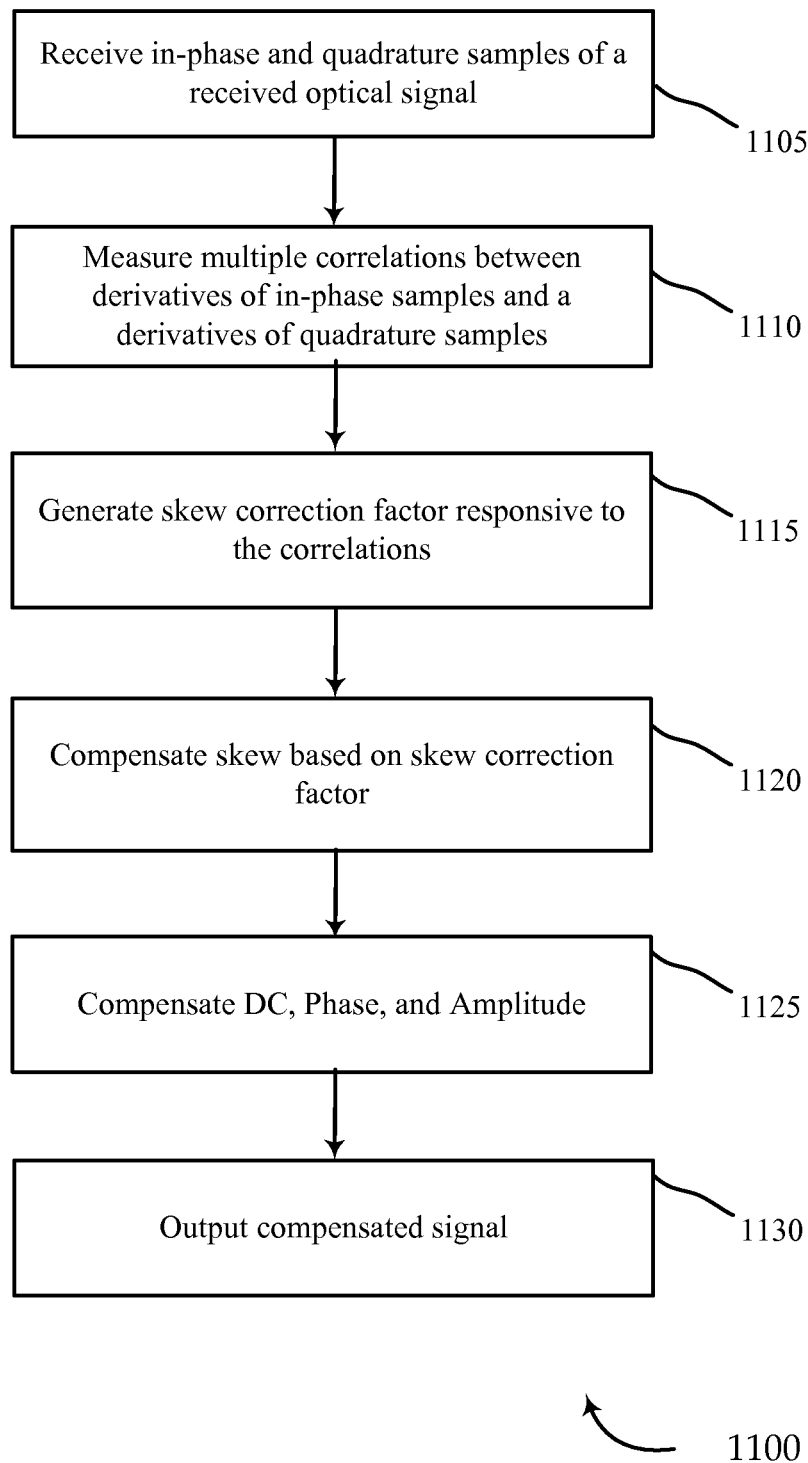
FIG. 11 is a flow chart of another method for skew compensation according to various embodiments of the invention.

FIG. 11 includes a flow chart diagram 1100 of the operations steps for operational steps for compensating skew according to other embodiments. Initially, at block 1105, a plurality of in-phase and quadrature samples of an optical signal are received. At block 1110 a correlation between multiple derivatives of the in-phase and quadrature samples is measured. A skew correction factor is generated, at block 1115, responsive to the correlations. The skew correction factor is used to compensate in received channels, according to block 1120. At block 1125, DC offset, phase and amplitude imbalances are compensated. Finally, at block 1130, skew compensated, and DC, phase, and amplitude compensated signals are output. The compensated signal may be output to the next component of the demodulator for the optical signal, such as a frequency offset removal module 420 of FIG. 4.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of skew compensation, the method comprising:
   receiving a plurality of in-phase and quadrature samples of a received optical signal;
   measuring a correlation between a derivative of the in-phase samples and a derivative of the quadrature samples, wherein measuring the correlation comprises:
      receiving frequency offset information corresponding to a difference between the frequency of the received samples and a baseband modulation frequency; and
      multiplying the frequency offset information by the derivative of the in-phase samples and the derivative of the quadrature samples; and
   generating a skew correction factor responsive to the correlation.

2. The method of claim 1, wherein
   the measuring comprises measuring a plurality correlations between one or more derivatives of the in-phase samples and one or more derivatives of the quadrature samples; and
   the generating comprises calculating the skew correction factor based on the plurality of measured correlations.

3. The method of claim 2, wherein calculating a skew correction factor comprises calculating an average of the plurality of measured correlations, and calculating the skew correction factor based on a prior skew correction factor and the calculated average.

4. The method of claim 1, further comprising:
   time-shifting an in-phase sample and a corresponding quadrature sample by a predetermined amount;

measuring a time-shifted correlation between a derivative of the time-shifted samples; and comparing the correlation and time-shifted correlation; and wherein generating a skew correction factor comprises generating a skew correction factor responsive to the compared correlations.

5. The method of claim 1, wherein the frequency offset information comprises a magnitude of the frequency offset.

6. The method of claim 1, wherein the frequency offset information comprises a sign of the frequency offset.

7. An apparatus for skew compensation between in-phase and quadrature channels in an optical signal, comprising:
a skew compensation module configured to receive a plurality of in-phase and quadrature samples of a received optical signal, receive skew update information, and output skew-compensated in-phase and quadrature samples based on the skew update information;
a skew correlation module configured to receive in-phase and quadrature samples of the received optical signal, and measure a correlation between a derivative of the in-phase samples and a derivative of the quadrature samples; and
a skew update module configured to receive the measured correlation information and generate a skew correction factor responsive to the correlation,
wherein the skew correlation module is further configured to receive frequency offset information corresponding to a difference between the frequency of the received samples and a baseband modulation frequency and measure correlation between a derivative of the in-phase samples and a derivative of the quadrature samples based on a product of the frequency offset information and the derivatives of the in-phase and quadrature samples.

8. The apparatus of claim 7, wherein the skew update module is configured to (i) receive a plurality of measured correlations between a derivative of the in-phase samples and a derivative of the quadrature samples, and (ii) calculate a skew correction factor based on the plurality of measured correlations.

9. The apparatus of claim 8, wherein the skew update module is configured to calculate an average of the plurality of measured correlations, and calculate the skew correction factor based on a prior skew correction factor and the calculated average.

10. The apparatus of claim 7, wherein the skew correlation module comprises:
a sampling module configured to provide in-phase and quadrature trial samples that include a predetermined amount of positive or negative skew; and
a measurement module configured to measure (i) a first correlation between a derivative of the in-phase samples and a derivative of the quadrature samples, and (ii) a second correlation between a derivative of the in-phase and quadrature trial samples.

11. The apparatus of claim 10, wherein the skew update module is configured to receive the first and second correlations and generate the skew correction factor based on the magnitude of the first and second correlations.

12. The apparatus of claim 10, wherein the sampling module is configured to provide a first set of in-phase and quadrature trial samples that include a predetermined amount of positive skew, and to provide a second set of in-phase and quadrature trial samples that include a predetermined amount of negative skew; and
wherein the measurement module configured to measure (i) a first correlation between a derivative of the in-phase samples and a derivative of the quadrature samples, (ii) a second correlation between a derivative of the first set of trial samples, and (iii) a third correlation between a derivative of the second set of trial samples.

13. The apparatus of claim 12, wherein the skew update module is configured to receive the first, second, and third correlations and generate the skew correction factor based on the magnitude of the first, second, and third correlations.

14. The apparatus of claim 13, wherein the skew correction factor is based on the minimum of the first, second, and third correlations.

15. The apparatus of claim 7, wherein the frequency offset information comprises a magnitude of the frequency offset.

16. The apparatus of claim 7, wherein the frequency offset information comprises a sign of the frequency offset.

17. A system of skew compensation, the system comprising:
means for receiving a plurality of in-phase and quadrature samples of a received optical signal;
means for measuring a correlation between a derivative of the in-phase samples and a derivative of the quadrature samples; and
means for generating a skew correction factor responsive to the correlation,
wherein the means for measuring a correlation comprises:
means for receiving frequency offset information corresponding to a difference between the frequency of the received samples and a baseband modulation frequency; and
means for multiplying the frequency offset information by the derivative of the in-phase samples and the derivative of the quadrature samples.

18. The system of claim 17, wherein
the means for measuring comprises means for measuring a plurality correlations between one or more derivatives of the in-phase samples and one or more derivatives of the quadrature samples; and
the means for generating comprises means for calculating the skew correction factor based on the plurality of measured correlations.

19. The system of claim 18, wherein the means for calculating a skew correction factor is configured to calculate an average of the plurality of measured correlations, and calculate the skew correction factor based on a prior skew correction factor and the calculated average.

20. The system of claim 17, further comprising:
means for time-shifting an in-phase sample and a corresponding quadrature sample by a predetermined amount;
means for measuring a time-shifted correlation between a derivative of the time-shifted samples; and
means for comparing the correlation and time-shifted correlation;
and wherein the means for generating a skew correction factor is configured to generate a skew correction factor responsive to the compared correlations.

21. The system of claim 17, wherein the frequency offset information comprises a magnitude of the frequency offset.

22. The system of claim 17, wherein the frequency offset information comprises a sign of the frequency offset.

* * * * *